United States Patent [19]

Ott et al.

[11] Patent Number: 5,081,440
[45] Date of Patent: Jan. 14, 1992

[54] BUS COUPLER

[75] Inventors: Hans Ott, Regensburg; Hermann Zierhut, Munich, both of Fed. Rep. of Germany

[73] Assignee: Siemens Aktiengesellschaft, Berlin & Munich, Fed. Rep. of Germany

[21] Appl. No.: 422,123

[22] Filed: Oct. 16, 1989

[30]  Foreign Application Priority Data

Oct. 24, 1988 [EP]  European Pat. Off. ........... 88117678

[51] Int. Cl.⁵ .......................................... H04M 11/04
[52] U.S. Cl. ............................ 340/310 A; 340/310 R
[58] Field of Search .......... 340/310 A, 310 R, 825.02; 364/492; 375/37, 99, 121

[56]  References Cited

U.S. PATENT DOCUMENTS 4,707,672 11/1987 Duret et al. ........................... 333/4
4,949,066 8/1990 Reinhardt ................... 340/310 A X

FOREIGN PATENT DOCUMENTS 2113931 5/1972 Fed. Rep. of Germany .
3322152 1/1985 Fed. Rep. of Germany .
2584555 1/1987 France .

OTHER PUBLICATIONS

Handbuch fur Hochfrequenz-und Elektro-Techniker, 1969, pp. 438-447.

Primary Examiner—Jin F. Ng
Assistant Examiner—Jeffery A. Hofsass
Attorney, Agent, or Firm—Kenyon & Kenyon

[57]  ABSTRACT

A bus coupler for coupling transmitting and receiving stations to a two-conductor bus which feeds d-c current for coupling the on-board networks of the stations. It is designed for information traffic, for instance, with digital data transmission, for measuring and controlling and/or with analog signals for measuring and controlling and for speech transmission in that the information is superimposed as a completely symmetrical a-c voltage relative to a floating imaginary centralized ground, where the bus coupling comprises a switch for power and information which couples the information in and out, conductively separated from the power path.

3 Claims, 3 Drawing Sheets

BUS COUPLER

BACKGROUND OF THE INVENTION

The present invention relates to a bus coupler for coupling transmitting and receiving stations to a two-conductor bus. Bus systems of the most varied design and with the most varied transmission philosophies are known. Digital data can be transmitted for measuring or controlling, or analog signals can be transmitted. Bus systems are also suited for the transmission of speech information.

Stations connected to a bus are connected via bus couplers. Besides data-processing stations, it is known to operate also other stations such as sensors, wired equipment and motor-driven equipment such as louvers. The system can be designed centrally or decentralized; apart from the information or the intelligence, the power for the on-board (power) network must be supplied. In addition, also the consumer energy must be fed to power consumers such as motors, lamps or heaters.

A decisive factor for the economy of the bus system is the interaction between the bus and the bus couplers as well as the number of transmission paths required.

SUMMARY OF THE INVENTION

It is an object of the present invention to develop an economical bus coupler with respect to an economical bus system.

The above and other objects of the present invention are achieved by a bus coupler, a bus-coupler for coupling transmitting and receiving stations to a two-conductor bus, the bus-coupler feeding direct current power for supplying the on-board networks of the stations and for information transfer, the information being superimposed as a fully symmetrical a-c voltage relative to an imaginary centralized floating ground, whereby the bus-coupler comprises a switch for power and information transfer which couples the information in or out conductively separated from the power, the power being coupled in a power path.

Accordingly, the bus coupler serves for coupling transmitting and receiving stations to a two-conductor bus, which feeds d-c power for supplying the on-board networks of the stations and in which fully symmetrical a-c voltage relative to an imaginary centralized floating ground is superimposed for the information traffic. The bus coupler comprises the switch for power and information, where the information is coupled in or out conductively separated from the power path. Via the bus, digital and/or analog data for measuring or controlling as well as speech can be transmitted. The system can be realized particularly simply, makes possible tree structures and requires only two conductors for the transmission of information and for transmitting power for the on-board networks. As far as the choice of the voltage level for the power supply of the on-board networks is concerned, one is free of the voltage level for the information transmission. For a number of applications it is advantageous to choose the voltage of the on-board networks lower than the voltage of the power consumers to be addressed. By the metallic separation, the otherwise frequently interfering hum loops in the signal path are avoided. The operating voltage for the on-board networks can in this connection be designed as an interruption-free d-c transmission system.

It is of further advantage that the potential of the transformer coil in the information path can be chosen freely and can be adapted to the requirements regarding the impedance of the coupling circuit and/or the bus impedance. In this connection it is significant that in the arrangement according to the invention only small matching losses are produced. In the customary metallic coupling according to the general state of the art, considerably higher losses occur.

A substantial advantage of separating the receivers conductively from the bus, which can be accomplished, for instance, capacitively, inductively or optically, is further that the information becomes free of background interference on the bus due to the energy transformation, such as the operating voltage and its fluctuations. Because of the symmetrical transmission, the signals cancel each other as seen from the outside, since there is at any instantaneous positive signal amplitude, a negative one of the same magnitude, and vice versa. This means that only very small interference radiations can take place by the bus lines. The symmetrical transmission furthermore causes, in connection with the transformer, a very great resistance to interference with respect to an external signal pickup on the bus line because only different signals can get on the bus lines, but not common-mode signals as are caused essentially by external interference sources. Without this transmitting principle, the components connected to the bus would have to be designed for higher power and less economically.

In information-transmitting systems it has been known for a long time to conduct several information paths, for instance, a-c signals and d-c signals, superimposed on a two-wire line; in bus systems, however, it has been customary to date to provide separate power supply lines or to work, for instance, with modulated power supplies or to transmit the information messages in gaps of the supply.

For a transmitter and a receiver, respectively, it is also known (DE-AS 2 113 931) in a two-wire line, to couple-in information via a respective switch from and to the line and to transmit at the same time power via the line. However, the line is not provided for coupling a multiplicity of subscribers as a bus line.

Known is also a method and a circuit arrangement (DE-OS 3 322 152), according to which a single terminal is supplied with power, but not a multiplicity of subscribers according to the subject of the invention.

The switch for power and information may advantageously comprise a transformer, one branch of which is connected to a coupling circuit for the transforming input or output coupling of information as the information branch. The other branch of the transformer is connected as the bus branch to the bus conductor. The bus branch of the transformer is interrupted by a capacitor for closing the information path with respect to the power path. From the interruption point, connecting conductors lead as the power path to the coupling circuit in order to assure its power supply. This capacitor can serve at the same time for smoothing or as a power accumulator for short-time interruption of the on-board supply. All three functions can be fulfilled at the same time with one capacitor.

It is particularly advantageous to design the bus coupler in accordance with a further embodiment in which the information branch of the transformer is connected, taking into consideration the winding direction of the transformer coils as to the polarity of the signal pulses of the information so that to the coupling circuit its magnetic field is substantially opposed to the magnetic field of the bus branch due to a d-c premagnetization by the d-c power supplied. Thereby, starting from the operating point in the transformer characteristic which is located shifted from the origin in the direction of the saturation region, the operation is shifted back in the direction of the origin or beyond. Thereby one operates in the more advantageous linear characteristic region and less transmitting power is required.

BRIEF DESCRIPTION OF THE INVENTION

The invention will now be explained in greater detail, referring to the embodiments reproduced highly schematically in the drawings, in which.

DETAILED DESCRIPTION

Figure 1:
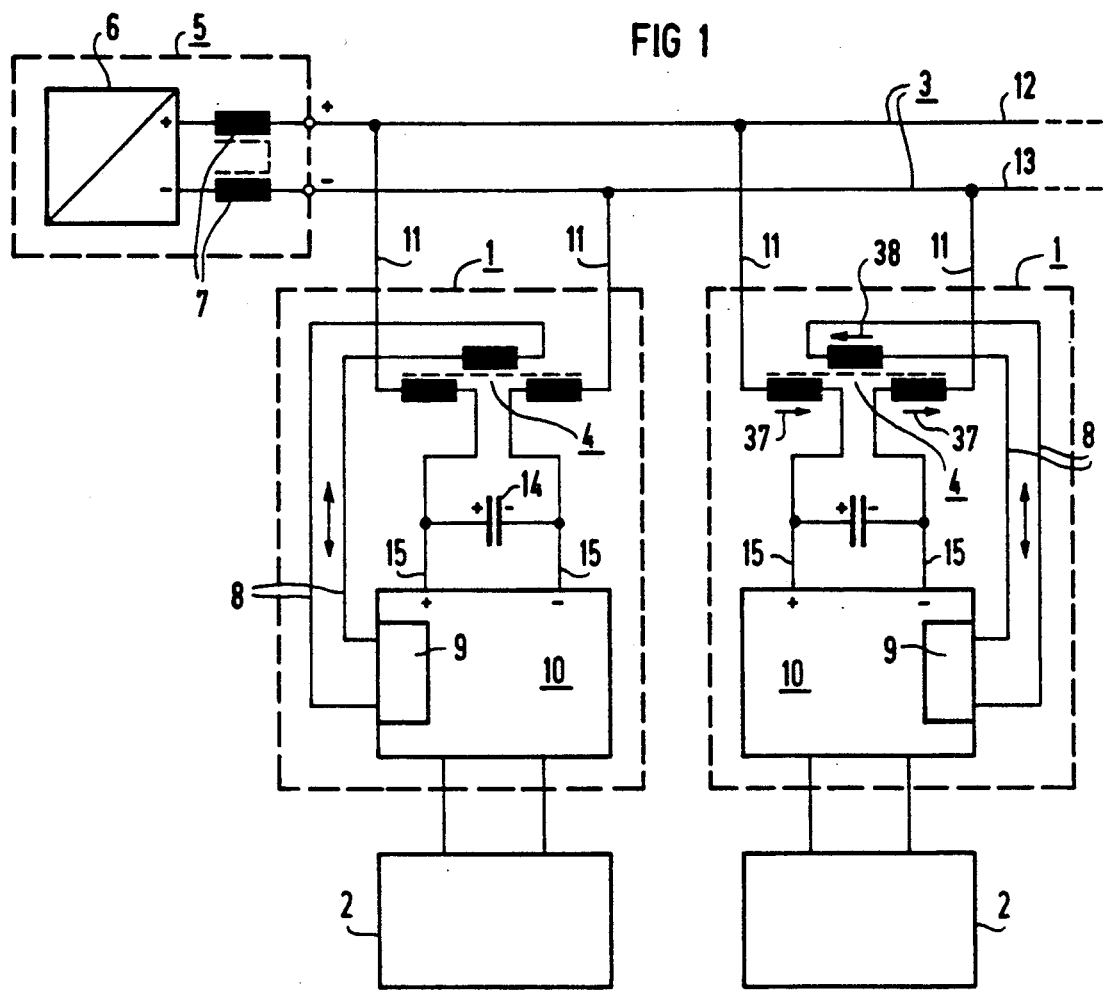
FIG. 1 shows bus couplers in interaction with a bus and wiring equipment.

The bus coupler 1 according to FIG. 1 serves for coupling transmitter and receiver stations 2 to a two-conductor bus 3. The bus 3 carries d-c current for supplying the on-board networks of the stations 2 as well as signals for the information traffic. Each bus coupler 1 comprises a switch 4 for power and information where the information is coupled in and out, conductively separated from the power path. A voltage supply 5 consists substantially of an a-c to d-c converter 6 and a blocking choke 7.

The switch 4 for power and information comprises, in the embodiment shown in FIG. 1, a transformer, one branch 8 of which is connected for coupling information in and out by transformer as the information branch 8, to a transceiver 9 of a coupling circuit 10. The transceiver insures processing the transmitting and receiving signals. The coupling circuit also performs, in addition, the processing and preparation of the information to be transmitted. The other branch of the transformer is connected as the bus branch 11 to the bus conductors 12, 13. The bus branch 11 of the transformer is interrupted by a capacitor 14 in series with the power path and disposed across the power input terminals of the coupling circuit 10. The information path is closed via the capacitor 14. From the interruption point, connecting lines lead to the coupling circuit 10 as the power branch 15. They serve for the power supply of the coupling circuit 10 and optionally also for the power supply of connected stations and equipment.

Figure 2:
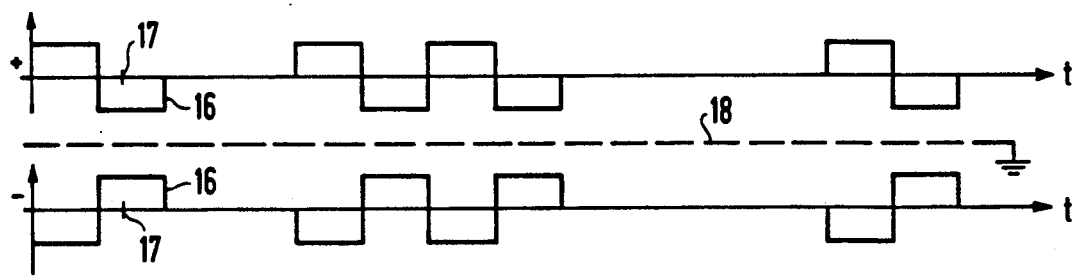
FIG. 2 shows the signal waveform on the bus diagrammatically.

The voltage waveform on the bus 3 conductors 12 and 13 is shown by way of example in FIG. 2. The voltage waveform of the conductor 13 is shown on the lower time axis and on the conductor 12 on the upper time axis. The lower conductor is then at a negative d-c potential and the upper conductor at a positive d-c potential. Superimposed is a completely symmetrical a-c voltage 16. On the abscissa of the diagram, the time is plotted, and the voltage on the ordinate. At the instant 17, a positive a-c voltage is superimposed on the negative d-c voltage on the lower conductor and a negative a-c voltage on the positive d-c voltage on the upper conductor. Relative to a centralized imagined floating ground 18, the superimposed a-c voltage for the information transmission is symmetrical.

Figure 3:
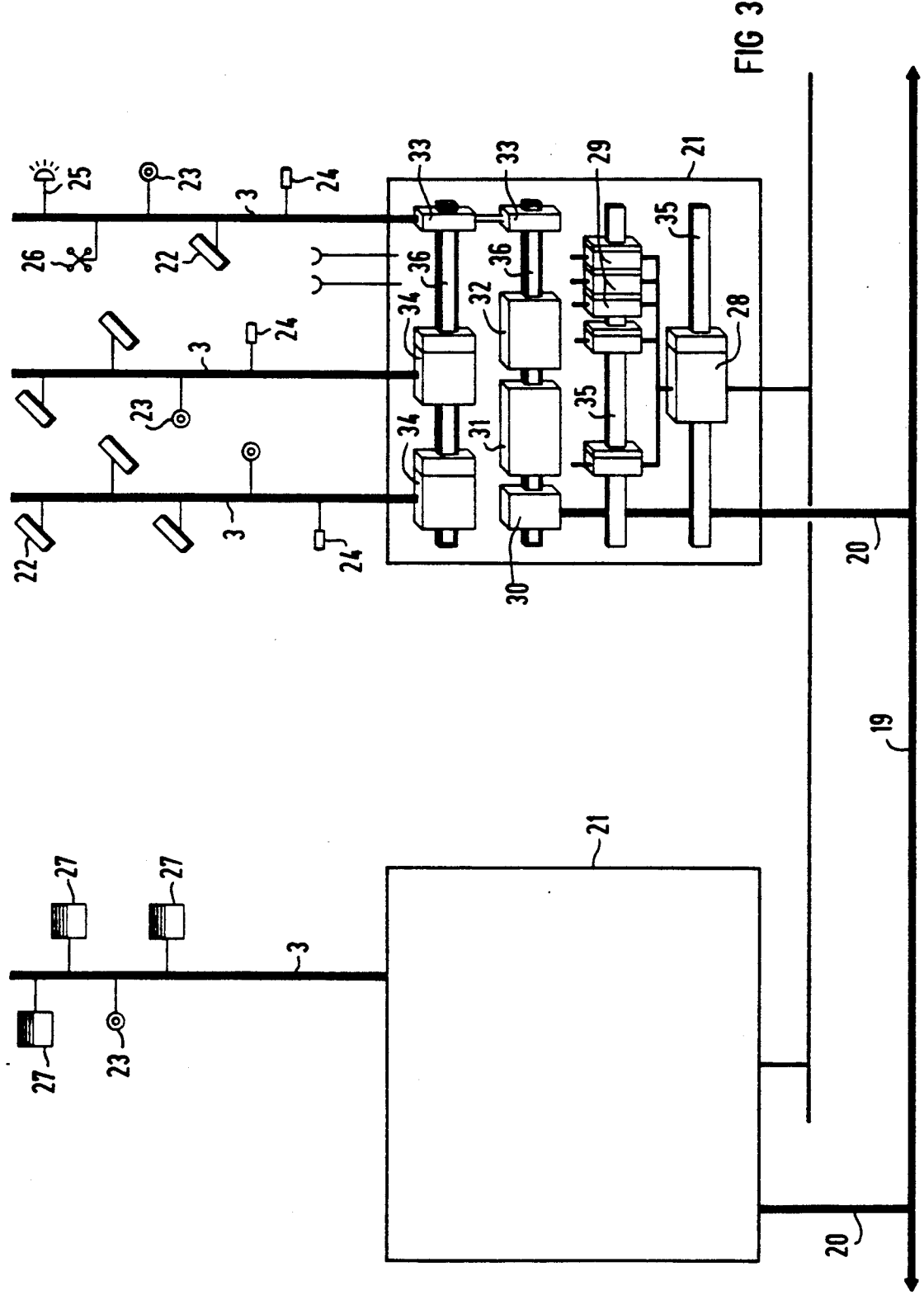
FIG. 3 shows an installed system with a bus schematically.

In the example according to FIG. 3, branches 20 start from a main bus 19 to wired distribution systems 21. From the latter, respective buses 3, lead as further branches, as a line bus to transmitting and receiving stations. In the embodiment, the wired equipment, such as lamps 22, keys 23, infrared transmitter and receivers 24, light sensors 25, wind sensors 26 and louvers 27, and their motor drives, are shown. In the distribution bus 21 can be arranged, for instance, fault protection switches 28, line protection switches 29, bus couplers 30 of different types, controllers 31, voltage supplies 32, connectors 33, and line modules 34 on support bars 35 and 36. The support bars 36 perform bus functions at the same time. The voltage supply 5 according to FIG. 1, can be understood to be a voltage supply 32 or as a line module 34, where the line modules 34 take over further functions in a manner known per se.

Figure 4:
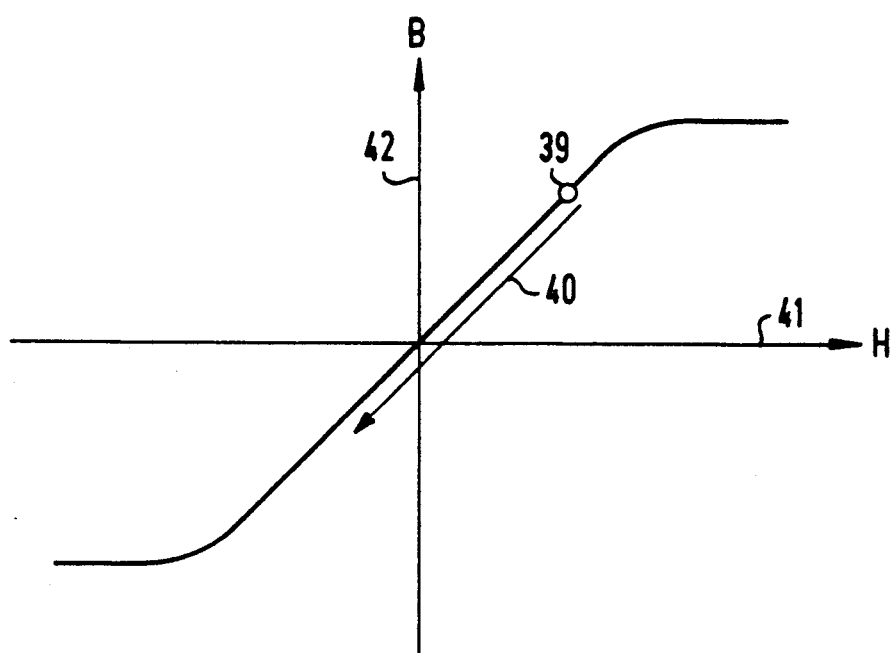
FIG. 4 shows the operating point and the operation according to a further embodiment, making reference to the transformer characteristic of the bus coupler.

In the embodiment according to FIG. 1, the right-hand bus coupler 1, according to a further embodiment, has the peculiarity that the information branch 8 of the switch 4 designed as a transformer is connected, taking into consideration the sense of the winding of the transformer coils with respect to the polarity of the signal pulses of the information, to the coupling circuit 10 such that the field in the information branch is substantially opposed to the field of the bus branch 11, as is illustrated by the arrows 37 in the bus branch 11 and 38 in the information branch 8. Thereby, the field in the bus branch is generated by d-c premagnetization due to the d-c power fed in. The arrows point in the direction of the magnetic flux in the coil. Referring to the magnetization curve or transformer characteristic in the diagram according to FIG. 4, the operation is thus shifted from the operating point 38 in the direction of the arrow 40 to the origin or to the linear part of the characteristic. On the abcissa is plotted the field strength H and on the ordinate, the magnetic induction B. The required transmitting power can therefore be reduced.

What is claimed is:

1. A bus-coupler for coupling transmitting and receiving stations to a two-conductor bus, the stations connected in parallel to the two conductor bus, the bus-coupler feeding direct current power for supplying on-board networks of the stations and for transmitting and receiving information between the stations, the information being superimposed as a fully symmetrical a-c voltage relative to an imaginary centralized floating ground, whereby the bus-coupler comprises a switch for power and information transfer which couples the information in and out, said switch conductively separating an information branch upon which the information is coupled, from a bus branch, and where the power is coupled to the networks through a power path.

2. The bus coupler recited in claim 1 wherein the switch for power and information transfer comprises a transformer having one branch connected to an output and/or input coupling of information as an information branch with a coupling circuit and another branch connected as a bus-branch with the two bus-conductors whereby the bus branch of the transformer is interrupted at an interruption point by a capacitor for closing the information path with respect to the power path and from the interruption point, connecting circuits lead as a power branch to the coupling circuit to provide power thereto.

3. The bus-coupler recited in claim 2, wherein the information branch of the transformer, in consideration of the sense of winding of transformer coils with regard to the polarity of the signal impulses of the information, is connected to the coupling circuit such that the field of the coil of the information branch is substantially directed against the field of the bus-branch due to a dc-premagnetizing by the dc current in the bus-branch.

* * * * *